(12) United States Patent
Kawakami

(10) Patent No.: US 7,946,714 B2
(45) Date of Patent: May 24, 2011

(54) PROJECTOR UNIT

(75) Inventor: Etsuro Kawakami, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 565 days.

(21) Appl. No.: 12/077,509

(22) Filed: Mar. 19, 2008

(65) Prior Publication Data

US 2008/0231813 A1    Sep. 25, 2008

(30) Foreign Application Priority Data

Mar. 22, 2007   (JP) .................................. 2007-074786

(51) Int. Cl.
*G03B 21/14* (2006.01)

(52) U.S. Cl. .......................................... 353/69; 353/101

(58) Field of Classification Search .................... 353/69, 353/70, 101; 356/3.1, 3.11, 3.12
See application file for complete search history.

(56) References Cited

U.S. PATENT DOCUMENTS

| | | | | |
|---|---|---|---|---|
| 3,963,337 | A * | 6/1976 | Lundberg | 353/70 |
| 5,355,188 | A * | 10/1994 | Biles et al. | 353/69 |
| 5,836,664 | A * | 11/1998 | Conner et al. | 353/70 |
| 6,188,523 | B1 * | 2/2001 | Choi | 359/649 |
| 6,224,215 | B1 * | 5/2001 | Maximus et al. | 353/20 |
| 6,361,171 | B1 * | 3/2002 | Ejiri et al. | 353/69 |
| 7,145,728 | B2 * | 12/2006 | Cha | 359/637 |

FOREIGN PATENT DOCUMENTS

| | | |
|---|---|---|
| CN | 1755453 A | 4/2006 |
| JP | 4-50828 U | 2/1992 |
| JP | 2006-018247 A | 1/2006 |
| JP | 2006-340299 A | 12/2006 |

OTHER PUBLICATIONS

Japanese Office Action dated Feb. 5, 2009 (2 pages), and English translation thereof (2 pages) issued in counterpart Japanese Application No. 2007-074786.

Chinese Office Action dated May 8, 2009 and English translation thereof issued in a counterpart Chinese Application No. 200810087343.0.

* cited by examiner

*Primary Examiner* — William C Dowling
(74) *Attorney, Agent, or Firm* — Holtz, Holtz, Goodman & Chick, PC

(57) ABSTRACT

There is provided a projector unit which can facilitate the design of lenses and project a distortionless and clear image and which comprises a projection optical system in which an optical axis of a projection lens does not coincide with a center of a rectangular image plane of an optical modulator for forming a projected image which corresponds to an image that is projected onto a screen, wherein the optical modulator is disposed in such a manner as to be tilted so that the optical axis of the projection lens and a center normal of the image plane of the optical modulator intersect each other.

16 Claims, 5 Drawing Sheets

7,946,714 B2

PROJECTOR UNIT

CROSS-REFERENCE TO RELATED APPLICATION

This application is based upon and claims the benefit of priority from the prior Japanese Patent Application No. 2007-074786, filed on Mar. 22, 2007, the entire contents of which are incorporated herein by reference.

BACKGROUND OF THE INVENTION

1. Field of the Invention

The present invention relates to a projector unit for projecting an image which is formed by an optical modulator onto a screen or a wall.

2. Description of the Related Art

In these days, in many cases, video projectors are used as a projector unit for projecting images transferred from a personal computer or a video recorder.

The video projector as the projector unit has a high-intensity light source, a color wheel for sequentially converting white light from the light source into red light, green light and blue light, and a light source side optical system for irradiating the red light, green light and blue light that have passed through the color wheel on to an optical modulator such as a DMD and is configured to project an image beam formed by the optical modulator on to a screen or the like by a projection lens, which constitutes a projection optical system.

The optical axis of a lens optical system, such as a projection optical system of a projector unit like this or an image pick-up optical system built in a camera is generally made to lie vertical relative to an image plane of an optical modulator or a photoelectric conversion light receiving element in order to reduce field curvature or other aberrations caused by a lens, and normally, the optical axis of the lens optical system is made to coincide with the center normal of the image plane of an optical modulator or light receiving element. For example, in the light receiving element, as is shown in Japanese Unexamined Patent Publication No. 2006-340299, a package is proposed in which the mounting angle of the light receiving element is made adjustable so that the light receiving element is adjusted in such a manner that the optical axis of the lens optical system becomes vertical relative to the center of a light receiving plane and is then fixed in place.

SUMMARY OF THE INVENTION

The present invention has been made in view of the situations described above and an objective thereof is to provide a projector unit which can facilitate the design of lenses and enables a projection of a clear and distortionless full-color image free from distortion.

According to a preferred embodiment of the invention, there is provided a projector unit including a projection optical system in which an optical axis of a projection lens does not coincide with a center of a rectangular image plane of an optical modulator for forming a projected image which corresponds to an image that is projected onto a screen, wherein the optical modulator is disposed in such a manner as to be tilted so that the optical axis of the projection lens and a center normal of the image plane of the optical modulator intersect each other.

DESCRIPTION OF THE PREFERRED EMBODIMENTS

According to a preferred embodiment of the invention, there is provided a projector unit including a projection optical system in which the center of an image plane of an optical modulator for forming a projected image which corresponds to an image that is projected onto a screen does not coincide with an optical axis of a projection lens, wherein the image plane of the optical modulator for forming a projected image which corresponds to an image that is projected onto a screen is made rectangular, a distance between the center of the image plane which is made rectangular and the optical axis of the projection lens is made one fourth or more of a shorter side of the image plane, and two corners of the image plane of the optical modulator which constitute ends of a longer side of the image plane, respectively, are disposed on a plane which is vertical relative to the optical axis of the projection lens and in positions which lie equidistant from the optical axis, whereby the optical modulator is tilted in such a way that the optical axis of the projection lens and a center normal of the image plane of the optical modulator intersect each other.

In addition, the position and tilt angle of the optical modulator are set such that three points made up of the position of the optical axis of the projection lens on the image plane of the optical modulator and the two corners of the image plane which are the ends of the longer side of the image plane which constitute the positions thereon which are farthest away from the optical axis are made to lie on a Petzval surface of the projection lens.

In addition, when the angle of the optical modulator relative to the optical axis of the projection lens is made variable and the Petzval curve changed due to the projection lens being adjusted for zooming or focusing, there may be provided an angle adjusting unit for changing the angle of the optical modulator in accordance with a change in curvature of the Petzval curve.

Figure 1:
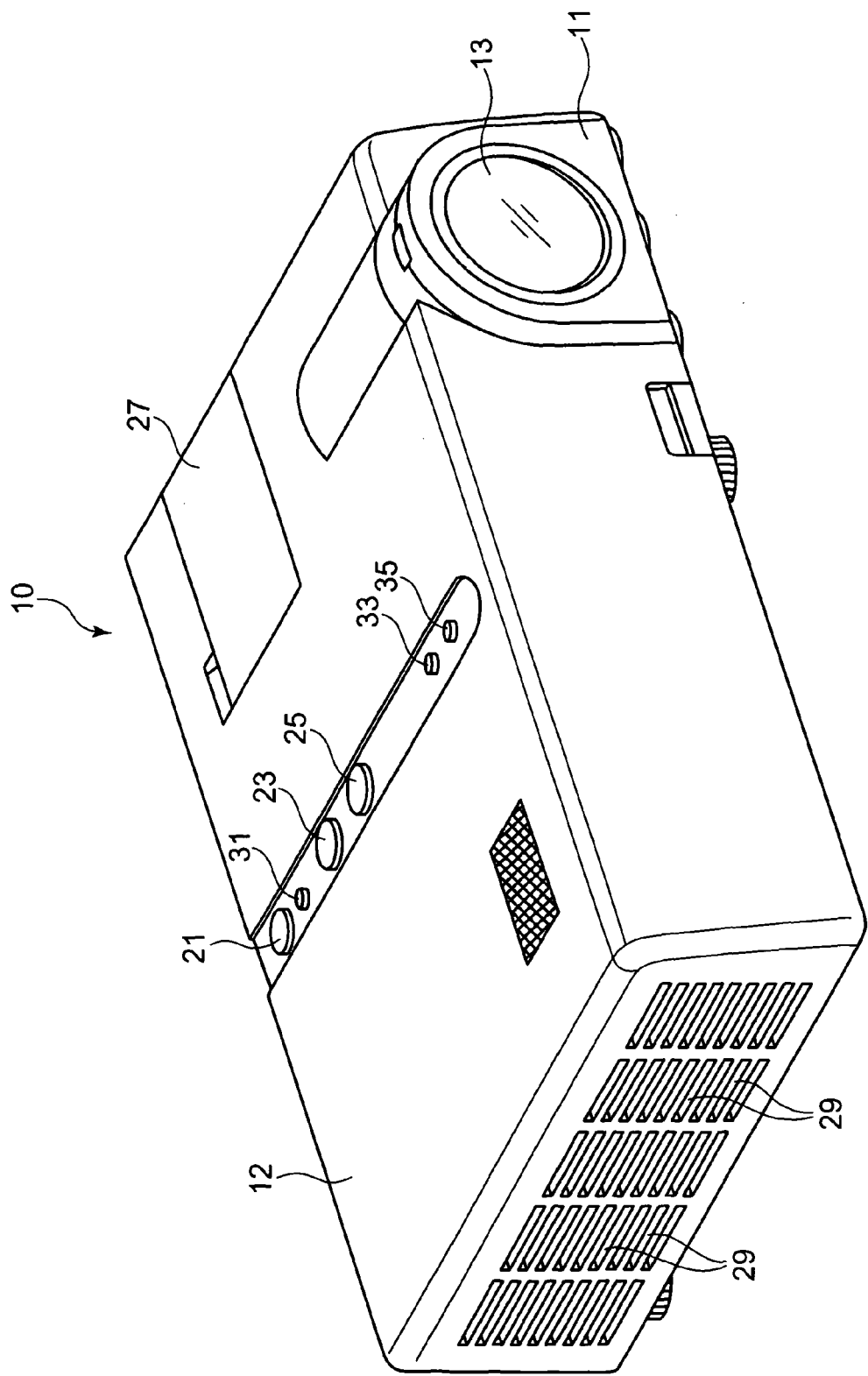
FIG. 1 is a diagram showing an embodiment of a projector unit according to the invention.

A projector as the projector unit according to the invention is a projector 10 as shown in FIG. 1 which has a projection opening 13 having a lens cover 11 which is provided on a front side of a substantially rectangular parallelepiped case, keys and indicators on an upper side of the case which include a power supply key 21, an automatic image quality adjusting key 23, a manual image quality adjusting key 25, a power supply lamp indicator 31, a light source lamp indicator 33, an overheat indicator 35 and the like, and on a back side of the case, not shown, various types of signal input terminals such as USB terminals to which a power supply connector and a personal computer are connected, and a video terminal and a mini disk sub terminal from which image signals are inputted.

Additionally, the projector 10 has sub-keys for fine adjusting image quality or image and setting various operations of the projector 10 underneath a lid 27 adapted to be opened and closed and inlet and outlet ports 29 of a cooling fan on lateral sides of the case.

Figure 2:
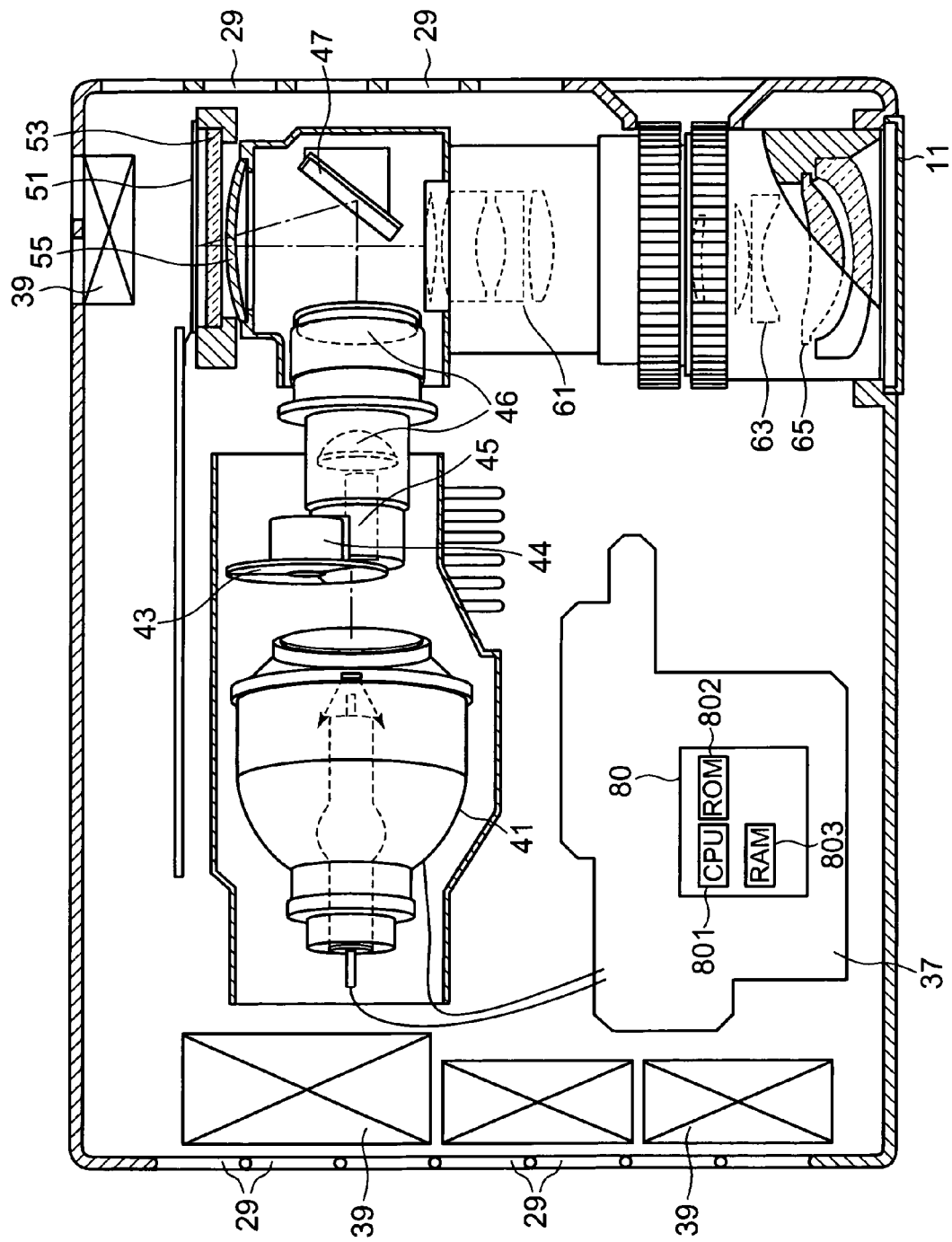
FIG. 2 is a diagram showing an interior construction of the projector unit according to the invention.

In addition, as is shown in FIG. 2, the projector 10 has in the interior thereof a light source unit 41 which incorporates an extra-high pressure mercury lamp or the like, a color wheel 43, and a light guide rod 45, a plurality of illumination lenses 46 and a single mirror 47 which constitute a light source side optical system.

Furthermore, the projector 10 has a CPU 801, a ROM 802 and a RAM 803 which constitute a projector control unit 80, and the projector 10 also incorporates therein the projector control unit 80 for controlling the illumination of a lamp of the light source unit 41 and an optical modulator 51 based on image signals and a circuit board 37 provided with a power supply circuit for supplying power to the light source unit 41 and the cooling fan 39.

The color wheel 43 is a disc on which sectorial segments of a red filter, a green filter and a blue filter are disposed in a circumferential direction and is adapted to be rotated by a wheel motor 44 while passing light from the light source unit 41 through the respective filters disposed circumferentially to thereby convert white light emitted from the light source unit 41 sequentially into light beams of three primary colors, that is, red light, green light and blue light.

The light guide rod 45 uniformly distributes the intensity of light across the width of a light beam that has passed through the color wheel 43 and causes the light beam to be incident on the illumination lenses 46 of the light source side optical system, the illumination lenses 46 being adapted to cause the light that has passed through the light guide rod 45 to converge on the optical modulator 51.

The mirror 47 is adapted to irradiate light that has passed through the illumination lenses 46 onto the optical modulator 51 from an oblique direction so that light reflected by the optical modulator 51 travels in a front direction of the optical modulator 51 when micromirror cells on the optical modulator 51 are tilted in one direction.

In addition, this mirror 47 is also adapted to irradiate light reflected thereby onto the optical modulator 51 from a direction which increases as much as possible a difference in angle between axes of bundles of light rays of an on-state light ray which is reflected in the front direction of the optical modulator 51 by the micromirror cells on the optical modulator 51 and an off-state light ray which is reflected by the optical modulator 51 when the micromirror cells on the optical modulator 51 are tilted in the other direction.

The optical modulator 51 is a rectangular DMD (digital micromirror device) which is ten and several millimeters long and wide, and five hundred thousands to a million and several hundred thousands micromirror cells are arranged into a grid to form a rectangular image plane 52, and the micromirror cells are each provided in such a manner as to tilt through an angle of 10 or more degrees from a flat plane position to the one and the other directions.

In addition, a cover glass 53 for protecting the optical modulator 51 and a condenser lens 55 for causing light reflected by the mirror 47, which is part of the illumination side optical system, to be incident on the optical modulator 51 as a bundle of parallel rays are provided in front of the optical modulator 51.

Figure 3:
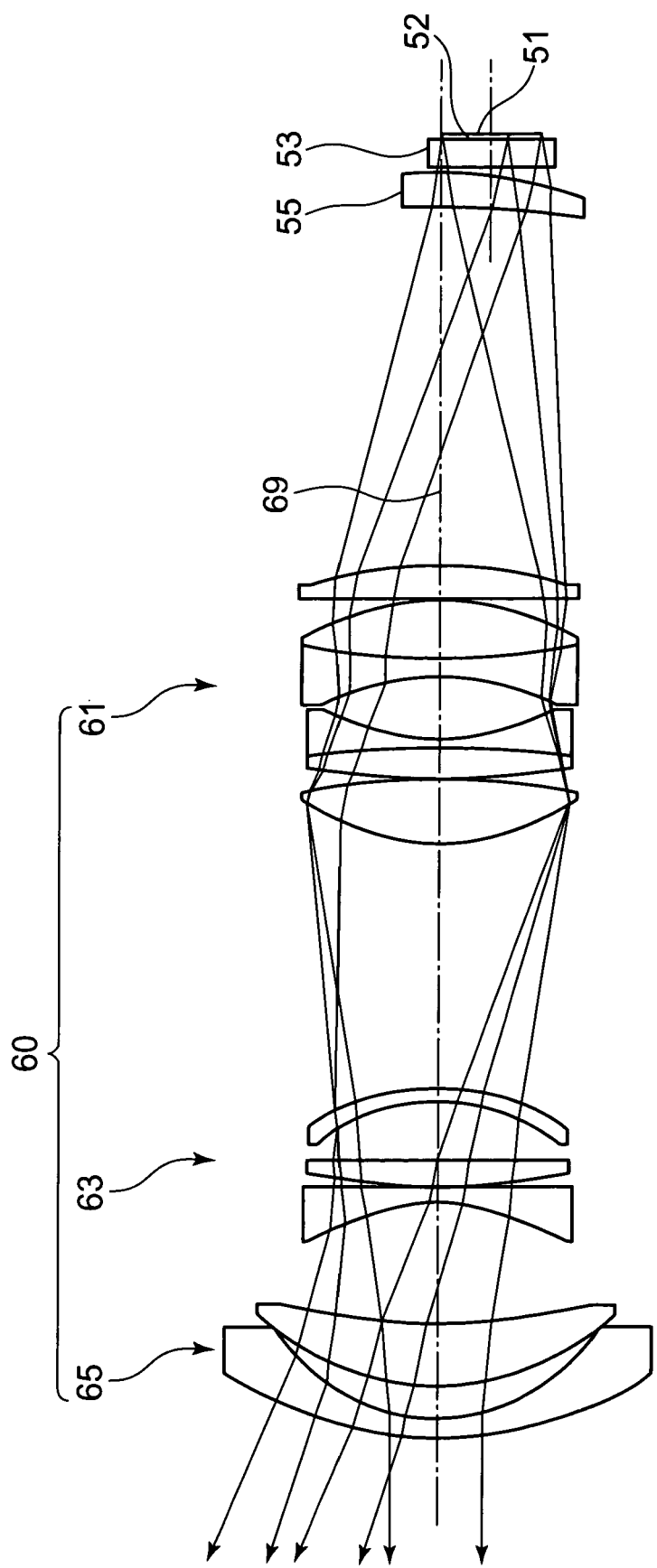
FIG. 3 is a diagram showing an optical system of the projector unit according to the invention.

A light image which is a projected image corresponding to an image that is projected onto a screen is formed by the on-state ray of light reflected by the optical modulator 51 in the front direction thereof, and this on-state ray of light is, as is shown in FIG. 3, such as to be passed through the condenser lens 55 to be incident on the optical modulator 51 and a projection lens 60 which is disposed to the front of the condenser lens 55 as a projection optical system.

This projection lens 60 is made into a variable-focal-length lens made up of a fixed lens unit or group 61, a first movable lens unit or group 63 and a second movable lens unit or group 65 and enables an adjustment of zooming magnification and focal point of the projected image onto the screen.

An optical axis 69 of the projection lens 60 is made to coincide with an optical axis 69 of the condenser lens 55, and the optical modulator 51 is disposed to be displaced further downwards than the optical axis 69 so that an upper edge of the image plane 52 of the optical modulator 51 lies in the position of the optical axis 69 of the projection lens 60, whereby a shifted optical system, in which the optical axis 69 of the projection lens 60 is made to be displaced from the center or the optical modulator 51, is realized which emits the on-state ray of light reflected in the optical modulator 51 in the direction of the optical axis 69 of the projection lens 60 and further upwards than the optical axis 69.

Figure 4:
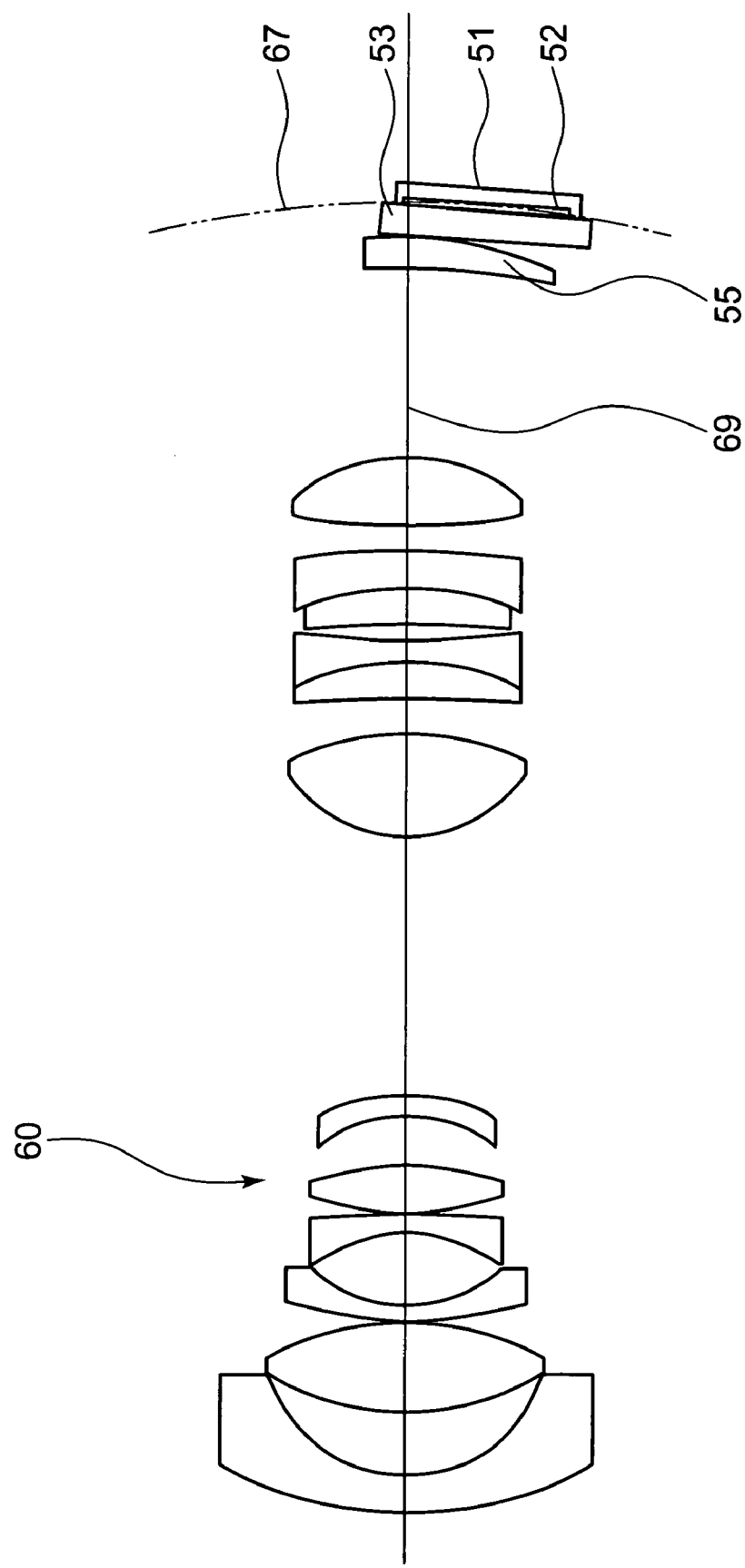
FIG. 4 is an exemplary diagram showing a main part of the projector unit according to the invention.

In addition, as is shown in FIG. 4, the optical modulator 51 is tilted so that the upper edge and lower edge of the image plane 52 of the optical modulator 51 which forms a projected image corresponding to an image projected onto the screen are made to coincide with a Petzval surface 67 of a lens group of the projection lens 60 and the condenser lens 55.

Namely, in tilting the optical modulator 51, a center normal of the image plane of the optical modulator 51 is made to intersect the optical axis 69 in such a way that the center of the upper edge of the image plane 52 which constitutes a longer side of the optical modulator 51 is made to coincide with the position of the optical axis 69 of the projection lens 60 and both ends of the lower edge of the image plane 52 which are farthest away from the optical axis 69 are made to be situated on a plane which becomes vertical to the optical axis 69, and the optical modulator 51 is tilted to coincide with a field curvature of the lens groups of the projection lens 60.

In this way, the optical modulator 51 is tilted in such a way that the ends of the lower edge lie equidistant from the optical axis 69 by making the center of the upper edge of the image plane 52 of the optical modulator 51 which forms a projected image corresponding to an image that is projected onto the screen coincide with the position of the optical axis 69 and positioning the ends of the lower edge of the image plane 52 on the plane which becomes vertical to the optical axis 69, whereby much of light reflected on the image plane 52 of the optical modulator 51 can be shone further upwards than the optical axis 69 as well as in the direction of the optical axis 69 via the projection lens 60.

In this way, by causing the center normal of the image plane 52 to intersect the optical axis 69 by tilting the optical modulator 51, the whole of the image plane 52 of the optical modulator 51 is allowed to approach a curved surface by the field curvature of the projection lens 60. Namely, in this projector 10, the optical modulator 51 is tilted in such a way that the two points made up of the position of the optical axis of the projection lens 60 which lies on the image plane 52 of the optical modulator 51 and a position which is symmetrical with the position of the optical axis 69 relative to the center of the image plane 52 or three points made up of the position of the optical axis 69 on the image plane 52 and two corner portions of the image plane 52 which lie farthest away from the optical axis 69 are made to coincide with the Petzval surface 67 of the projection lens 60 which is formed rearwards of the condenser lens 55 via the condenser lens 55.

In this way, in this optical system, by making the center of the upper edge of the image plane 52 of the optical modulator 51 coincide with the position of the optical axis 69 and making the two points made up of the center of the upper edge and the center of the lower edge or the three points made up of the center of the upper edge and the end portions of the lower edge coincide with the Petzval surface 67 of the projection lens 60, a maximum error between the image plane 52 of the optical modulator 51 and the Petzval surface 67 which is the image plane of the projection lens 60 is reduced, thereby making it possible to substantially reduce the amount of curvature aberration.

Because of this, in designing and producing a projection lens 60, without obtaining a strict lens combining condition for making the field curvature to come closer to a flat plane and combining lenses in such a manner as to satisfy the condition, the amount of error in position between the field curvature of the projection lens 60 and the image plane 52 which forms a projected image corresponding to an image projected onto the screen is reduced by the tilt of the optical modulator 51 so as to reduce curvature aberration, thereby making it possible to form a clear and distortionless projected image.

In addition, in the case of the projection lens 60 being a zoom lens, although the Petzval surface 67 of the projection lens 60 changes as the magnification thereof changes, the tilt of the optical modulator 51 is such as to be fixed to coincide with the Petzval surface 67 in such a state that the projection lens 60 is situated at a wide-angle end thereof.

In this way, in the event that the optical modulator 51 is fixed to coincide with the Petzval surface 67 resulting in such a state that the projection lens 60 is situated at the wide-angle end thereof, even though the error in position between the Petzval surface 67 of the projection lens 60 and the image plane 52 of the optical modulator 51 due to curvature aberration is increased when the projection lens 60 is situated at a telephoto end thereof, since the depth of focus becomes deeper at the telephoto end than at the wide-angle end, the projected image is disturbed little so as to be maintained clear and distortionless.

Figure 5:
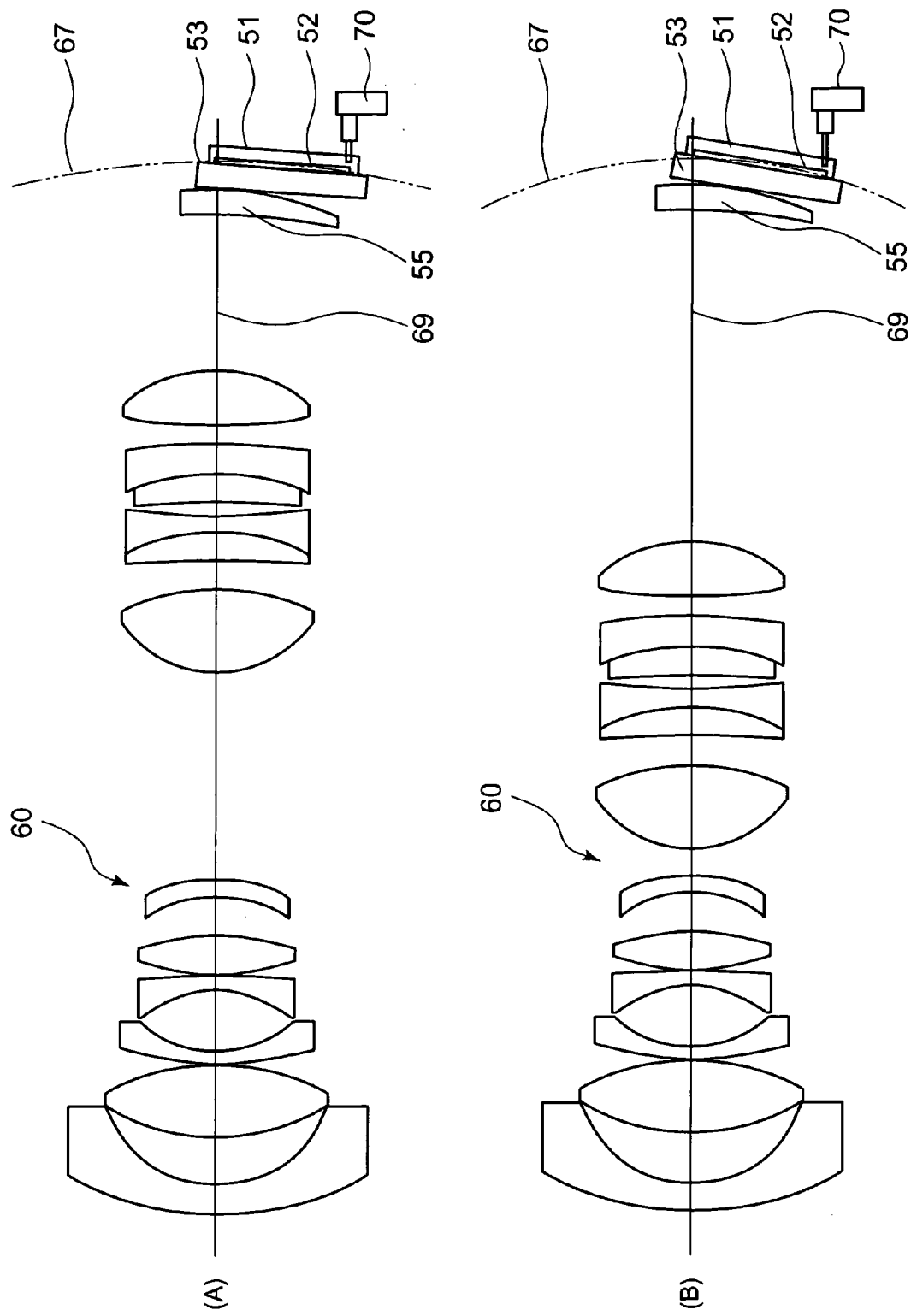
FIG. 5 is an exemplary diagram showing a main part of another embodiment of a projector unit according to the invention.

In addition, according to another embodiment of the invention, there is provided a projector unit in which an optical modulator 51 is made to oscillate about a straight line, as a rotational axis, which is parallel to a longer side of an image plane 52 of the optical modulator 51 and which intersects an optical axis 69 at right angles and an angle adjusting unit 70 such as an actuator having a screw portion which is moved back and forth while being rotated by a piezo actuator or a micromotor is provided in the vicinity of a lower end of the optical modulator 51, as is shown in FIG. 5.

In this way, when movable lens groups are shifted for zooming or focusing a projection lens 60 by providing the angle adjusting unit 70, by controlling the angle of the optical modulator 51 so as to match a change in a Petzval surface 67 while controlling the shift of the movable lens groups, the alignment of a lower edge of the optical modulator 51 with the Petzval surface 67 is prevented from being disturbed.

Consequently, when the magnification of a light image that is projected by zooming the projection lens 60 is changed, a clear and distortionless image can be projected in accordance with the magnification so changed, and when focusing the light image so projected, a more accurately adjusted focus can be attained, whereby a clear and distortionless image can be projected.

In addition, although the optical modulator 51 shown in FIGS. 3 to 5 is made into the shifted optical system in which the vicinity of the upper edge of the image plane 52 of the optical modulator 51 is made to coincide with the position of the optical axis 69 of the projection lens 60 and the center of the image plane 52 is offset from the optical axis 69, there may occur a case where a distance between the center of the image plane 52 of the optical modulator 51 and the optical axis 69 is made to be on the order of one fourth of the shorter side of the image plane 52 which constitutes the vertical side thereof so as to project a light image formed by the optical modulator 51 much further upwards than the optical axis 69 as well as in the direction of the optical axis 69, and hence, the distance between the center of the image plane 52 and the optical axis 69 is made to be on the order of one fourth to one half of the shorter side of the image plane 52.

In addition, in causing the position of the optical axis 69 on the image plane 52 to be located on the Petzval surface 67 of the projection lens 60, in the event that the position of the optical axis 69 of the projection lens 60 on the image plane 52 is located in a position which lies closer to the center of the image plane 52 than the upper side of the image plane 52, two points which lie on straight lines which extend from the center of the image plane 52 towards lower corners of the image plane 52 and which are situated downwards by the distance between the optical axis 69 and the center of the image plane 52 from the center of the image plane 52 are made to coincide with the Petzval surface 67.

In this way, when the position of the optical axis 69 of the projection lens is made to lie closer to the center of the image plane 52 than the upper edge of the image plane 52 of the optical modulator 51, although the height of part of a light image projected onto the screen which lies above the optical axis 69 becomes low, the maximum value or mean value of the error between the image plane 52 of the optical modulator 51 and the Petzval surface 67 of the projection lens 60 is reduced so as to reduce the disturbance to the light image by curvature aberration, thereby making it possible to project a clear and distortionless picture onto the screen.

Note that while in the embodiments, the micromirror display device is used as the optical modulator 51, there may be a case where a liquid crystal display device is used as the optical modulator 51, and furthermore, the invention is not limited to the optical modulator 51 made up of the micromirror or liquid crystal display device, and hence, there may also be a case where a projector unit such as a slide projector is used which is made up of an image plane such an appropriate picture or film on which an image for forming a light image is drawn and a light source unit for irradiating light on this image plane.

Incidentally, since the projector 10 including the light source unit 41 shown in FIGS. 1 and 2 is such as to form a projected image which corresponds to an image that is projected onto the screen by the optical modulator 51 which is controlled by the projector control unit, the projector 10 can project an image on the screen of a computer or a video image on to the screen in a clear and distortionless fashion.

Note that the invention is not limited to the embodiments that have been described heretofore but can be modified or improved variously without departing from the spirit and scope of the invention.

What is claimed is:

1. A projector unit comprising a projection optical system in which an optical axis of a projection lens does not coincide with a center of a rectangular image plane of an optical modulator for forming a projected image which corresponds to an image that is projected onto a screen, wherein the optical modulator is disposed in such a manner as to be tilted so that the optical axis of the projection lens and a center normal of the image plane of the optical modulator intersect each other, and wherein a position of the optical axis of the projection lens on the image plane and a position on the image plane which is symmetrical with the position of the optical axis relative to the center of the image plane are situated on a Petzval surface of the projection lens.

2. A projector unit as set forth in claim 1, wherein two corners which constitute ends of a longer side of the rectangular image plane are disposed on a plane which is vertical relative to the optical axis of the projection lens and in positions which lie equidistant from the optical axis.

3. A projector unit as set forth in claim 1, wherein a distance between a center of the rectangular image plane and the optical axis of the projection lens is a distance of one fourth or more of a shorter side of the image plane.

4. A projector unit as set forth in claim 2, wherein a distance between a center of the rectangular image plane and the optical axis of the projection lens is a distance of one fourth or more of a shorter side of the image plane.

5. A projector unit as set forth in claim 1, wherein an angle of the optical modulator relative to the optical axis of the projection lens is variable, and wherein the projector unit further comprises an angle adjusting unit which adjusts the angle of the optical modulator in accordance with zooming of the projection lens.

6. A projector unit as set forth in claim 2, wherein an angle of the optical modulator relative to the optical axis of the projection lens is variable, and wherein the projector unit further comprises an angle adjusting unit which adjusts the angle of the optical modulator in accordance with zooming of the projection lens.

7. A projector unit as set forth in claim 3, wherein an angle of the optical modulator relative to the optical axis of the projection lens is variable, and wherein the projector unit further comprises an angle adjusting unit which adjusts the angle of the optical modulator in accordance with zooming of the projection lens.

8. A projector unit as set forth in claim 1, wherein an angle of the optical modulator relative to the optical axis of the projection lens is variable, and wherein the projector unit further comprises an angle adjusting unit which adjusts the angle of the optical modulator in accordance with focusing of the projection lens.

9. A projector unit as set forth in claim 2, wherein an angle of the optical modulator relative to the optical axis of the projection lens is variable, and wherein the projector unit further comprises an angle adjusting unit which adjusts the angle of the optical modulator in accordance with focusing of the projection lens.

10. A projector unit as set forth in claim 3, wherein an angle of the optical modulator relative to the optical axis of the projection lens is variable, and wherein the projector unit further comprises an angle adjusting unit which adjusts the angle of the optical modulator in accordance with focusing of the projection lens.

11. A projector unit as set forth in claim 1, further comprising a light source unit, a color wheel, a light source side optical system, and a projector control unit.

12. A projector unit as set forth in claim 2, further comprising a light source unit, a color wheel, a light source side optical system, and a projector control unit.

13. A projector unit comprising a projection optical system in which an optical axis of a projection lens does not coincide with a center of a rectangular image plane of an optical modulator for forming a projected image which corresponds to an image that is projected onto a screen,
wherein the optical modulator is disposed in such a manner as to be tilted so that the optical axis of the projection lens and a center normal of the image plane of the optical modulator intersect each other, and
wherein a position of the optical axis of the projection lens on the image plane and positions of two corners which constitute ends of a longer side of the image plane which are spaced away from the optical axis of the projection lens are situated on a Petzval surface of the projection lens.

14. A projector unit as set forth in claim 13, wherein the two corners which constitute ends of a longer side of the rectangular image plane are disposed on a plane which is vertical relative to the optical axis of the projection lens and in positions which lie equidistant from the optical axis.

15. A projector unit as set forth in claim 13, wherein a distance between a center of the rectangular image plane and the optical axis of the projection lens is a distance of one fourth or more of a shorter side of the image plane.

16. A projector unit as set forth in claim 14, wherein a distance between a center of the rectangular image plane and the optical axis of the projection lens is a distance of one fourth or more of a shorter side of the image plane.

* * * * *